(12) United States Patent
Kuzma

(10) Patent No.: US 7,043,049 B2
(45) Date of Patent: May 9, 2006

(54) APPARATUS AND METHOD FOR MONITORING STREAMED MULTIMEDIA QUALITY USING DIGITAL WATERMARK

(75) Inventor: Andrew Kuzma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 09/728,572

(22) Filed: Nov. 30, 2000

(65) Prior Publication Data

US 2004/0202348 A1  Oct. 14, 2004

(51) Int. Cl.
*G06K 9/00* (2006.01)

(52) U.S. Cl. .................................. 382/100; 220/224

(58) Field of Classification Search ............... 382/100, 382/232, 240; 713/176, 179; 380/51, 54, 380/210, 252, 287, 201, 37, 42, 212; 705/1; 370/522–529; 725/20, 22, 96; 283/42, 74–81, 283/85, 93, 113, 901, 902; 358/3.28; 399/366; 386/94; 709/203, 218, 219–226, 229, 231; 715/736, 853, 969

See application file for complete search history.

(56) References Cited

U.S. PATENT DOCUMENTS

| | | | | | |
|---|---|---|---|---|---|
| 5,946,103 | A | * | 8/1999 | Curry | 358/3.28 |
| 6,041,041 | A | * | 3/2000 | Ramanathan et al. | 370/241 |
| 6,226,618 | B1 | * | 5/2001 | Downs et al. | 705/1 |
| 6,324,573 | B1 | * | 11/2001 | Rhoads | 709/217 |
| 6,385,329 | B1 | * | 5/2002 | Sharma et al. | 382/100 |
| 6,430,301 | B1 | * | 8/2002 | Petrovic | 382/100 |
| 6,453,420 | B1 | * | 9/2002 | Collart | 713/201 |
| 6,473,516 | B1 | * | 10/2002 | Kawaguchi et al. | 382/100 |
| 6,512,837 | B1 | * | 1/2003 | Ahmed | 382/100 |

* cited by examiner

*Primary Examiner*—Jingge Wu
*Assistant Examiner*—Abolfazl Tabatabai
(74) *Attorney, Agent, or Firm*—Blakely, Sokoloff, Taylor & Zafman LLP

(57) ABSTRACT

A method to monitor the quality of distributed multimedia content over a network is disclosed. A digital watermark is embedded into the multimedia content. Various monitoring clients are disbursed over the network. The monitoring clients receive the multimedia content and examine the digital watermark. Statistical information relating to the degradation of the content is then gathered by an analysis of the watermark.

19 Claims, 2 Drawing Sheets

APPARATUS AND METHOD FOR MONITORING STREAMED MULTIMEDIA QUALITY USING DIGITAL WATERMARK

TECHNICAL FIELD OF THE INVENTION

The present invention relates generally to streaming multimedia, and in particular, relates to a digital watermark used to monitor the quality of streamed multimedia over a network.

BACKGROUND OF THE INVENTION

Digital watermarks are currently commonly used to authenticate content that has the watermark. The digital watermark is typically embedded into the content by means of digital signal processing. In the case of multimedia content, the watermark is usually imperceptible to the human eye/ear when the content is reproduced. In this manner, the authenticity of the content can be determined without the watermark producing undesirable side-effects.

The digital watermark is designed to be robust to digital manipulation so that if the content is changed slightly, the watermark is persistent. In other words, unless the quality of the content is significantly degraded or changed, the watermark is still recoverable. The watermark allows the ownership to be determined up to a degree where the modified content is likely to be no longer useful. In this manner, digital reproduction of the content is discouraged. Examples of digital watermark techniques in the context of content authentication are described in U.S. Pat. No. 5,915,027 to Cox et al. and U.S. Pat. No. 6,101,602 to Fridrich.

While digital watermarking has been used in the context of authentication, as detailed below, other applications have arisen with the increase of networking. For example, the explosion of the Internet in the past decade has caused a corresponding explosion in the delivery of multimedia content over the Internet. Audio and video clips are now being routinely distributed over the Internet. Live broadcasts of events are now starting to become commonplace. One concern is the maintenance of content quality as the multimedia content is distributed over the Internet. For various reasons, it has been found that as content is packetized and routed over the Internet, degradation occurs. The present invention relates to the monitoring of this degradation.

BRIEF DESCRIPTION OF THE DRAWINGS

A non-limiting and non-exhaustive embodiment of the present invention is described with reference to the following Figures.

DETAILED DESCRIPTION

Embodiments of an apparatus and method for power continuity testing in a parallel testing system are described herein. In the following description, some specific details and examples are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention is implemented on a network, such as the Internet, to monitor the quality of distributed multimedia content. A digital watermark is embedded into the multimedia content. Various monitoring clients are disbursed over the network. The monitoring clients receive the multimedia content and examine the digital watermark. Statistical information relating to the degradation of the content is then gathered by an analysis of the watermark.

Figure 1:
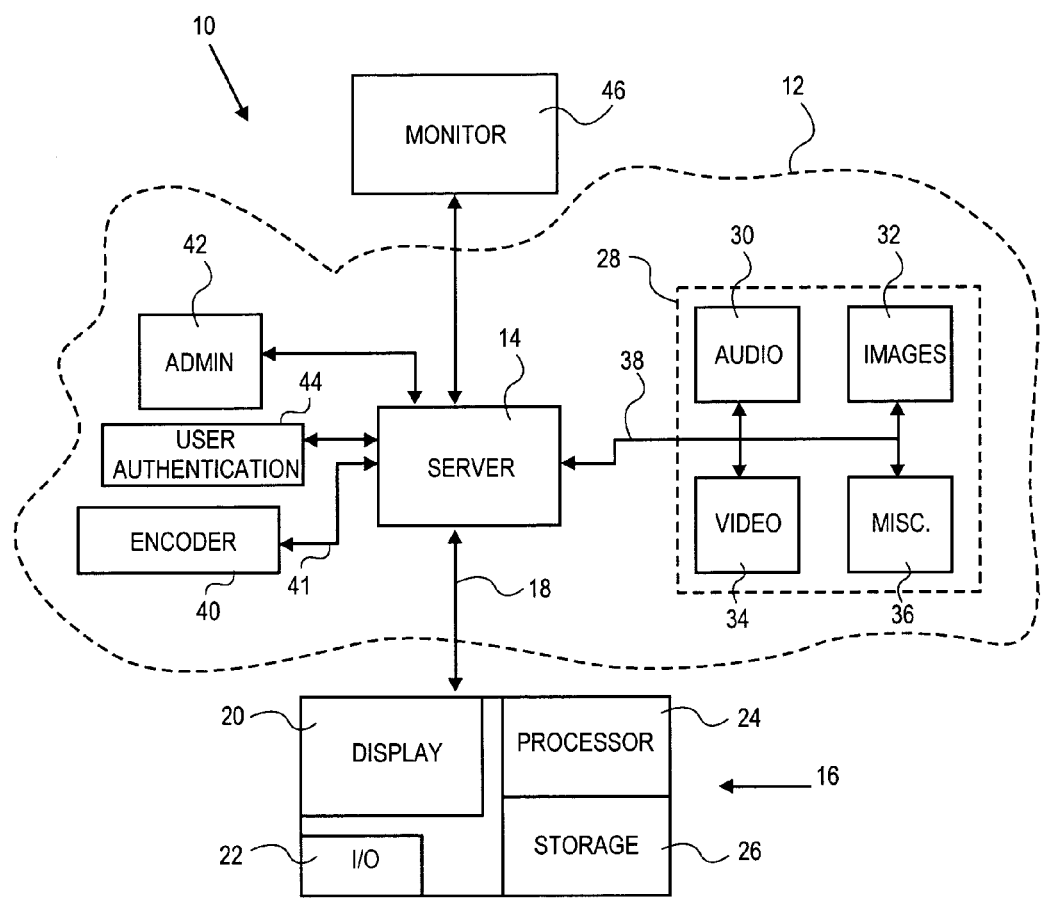
FIG. 1 is a schematic diagram showing one embodiment of a system for implementing the present invention.

Referring first to FIG. 1, shown generally at 10 is a system according to an embodiment of the invention. A network 12, such as the Internet, can implement the system 10, but other types of communication networks may be utilized as well. For example, the network 12 can comprise a local area network (LAN), virtual local area network (VLAN), asynchronous transfer mode (ATM) network, or other network or portion of a network.

The system 10 includes one or more network servers 14 communicatively coupled to one or more terminals 16 via one or more links 18. The server 14 can provide a web site having hypertext markup language (HTML) web pages to the terminals 16, using a protocol such as hypertext transfer protocol (HTTP). The terminals 16 can comprise personal computers (PCs) to access the server 14. The terminals 16 each have a display screen 20 that allows users to view information sent to and from the server 14. The terminal 16 can include an input/output unit 22, such as a keyboard and mouse. The terminal may also include a processor 24, and a storage unit 26, which can be any type of machine-readable storage medium such as a read-only memory (ROM), compact disks (CDs), digital video disks (DVDs), magnetic tape, floppy disk, etc.

Other types of terminals 16 besides PCs may be used. For example, the terminals 16 can include workstations (e.g., dumb terminals) connected to an internal computer network, enhanced-functionality wireless devices having display screens, laptops, television monitors, etc.

The link 18 and other links in the system 10 can include any type of high-speed data line(s) or network(s) that can accommodate high-speed bit rates, including T1, xDSL, SONET, ATM, Ethernet, etc. Telephone modem links may also be used. The link 18 can comprise hardwire links (e.g., twisted pair, optical fiber, coaxial, etc.) or wireless links (e.g., radio frequency, cellular, satellite, microwave, optical, etc.). A person skilled in the art will further appreciate that the speed of transmission of data via the link 18 may also vary from one system 10 to another, based on factors such as type of network or communication medium, level of network traffic, size of files being transmitted, etc. Therefore, embodiments of the invention are not limited by the specific type of terminals, networks, communication medium, data rate, etc. that are used by the system 10.

The system 10 can include one or more database systems 28 to store many types and formats of data. For example, the database system 28 can store recorded multimedia content for distribution over the Internet. The database system 28 can be part of the server 14 or it can be a separate network component communicatively coupled to the server 14. The database system can include one or more database units 30–36. For example, the database unit 30 can store audio files, such as .ra (Real Audio) or .wma (Windows Media) files. The database unit 32 can store images, such as photographs having .gif, .tif, JPEG, MPEG, etc. formats. The database unit 34 can store video files. The database unit 36 can store many types of miscellaneous content, such as executable files or Power Point files. The database units 30–36 can be coupled to each other and to the server 14, as shown symbolically by a link 38, thereby allowing communication/linking and exchange of data between these components.

In one embodiment, any of the database units 30–36 can store metadata that point to files (e.g., image files, media files, etc.) located on a distributed network of storage arrays (within the network 12 or the server 14), instead of or in addition to, such files located in the database system 28. Those skilled in the art will recognize that other methods of storage can store the files in any of the database units 30–36, in units/components separately located from the database system 28, in both locations, or in any other suitable location/manner. Furthermore, although the database units 30–36 as described store recorded content, live broadcasts may also be distributed by server 14. For live content, a real-time encoder 40 may be used to encode the content. The encoder 40 would receive as input live audio and video and encode it to various streaming multimedia formats. The encoder is coupled to the server 14, as shown symbolically by a link 41, thereby allowing communication/linking and exchange of data between these components.

While only four database units 30–36 are shown in FIG. 1, it is understood that there can be any number of database units. Further, it is possible to combine one or more database units into a single database unit. The database units 30–36 can comprise any type of computer-readable storage media having conventional database hardware configurations and associated data structures, or they can comprise, more or less, computer-readable storage media that can store and organize information other than in a "database-type" format. Accordingly, embodiments of the invention are not limited by the specific number, types, or arrangement of the database units. The manner of operation of the database units 30–36 to provide a user with customized online photo albums will be described in further detail below.

The system 10 can include a user authentication unit 44. The user authentication unit 44 stores user identifications (IDs), passwords, security codes, or other information required for granting the terminals 16 with access to the server 14. Each time any of the terminals 16 requests access to the server 14, that terminal sends a user ID, for example, to the server 14, which then grants access if the user ID matches user IDs of authorized users.

The server 14 may be communicatively linked to an administration unit 42. The administration unit 42 can be, for example, a company that provides and maintains the services of the server 14, including but not limited to, coordination of downloads into the database unit 32, providing user accounts and user IDs for the terminals 16, providing customer service support, processing billing and account information, etc.

Additionally, at least one monitor station 46 is provided in the network 12. The monitor station 46 periodically requests content from the server 14. Although only a single monitor station 46 is shown, in actual implementations, multiple monitor stations 46 would be placed at various nodes or locations of the network 12. As will be seen in further detail below, the monitor station 46 is used to monitor the quality of the content distributed by the server 14 over the network 12.

As delivery of multimedia content over large networks such as the Internet becomes more common, the operators of the server 14 need a method for assuring that the network has an acceptable impact on the quality of the content delivered to an end-user. Often, the operators of the server 14 are not the owners of the content, but merely contract with the content owners to provide the service. Thus, the content owners expect that the server 14 will deliver the content satisfactorily.

Figure 2:
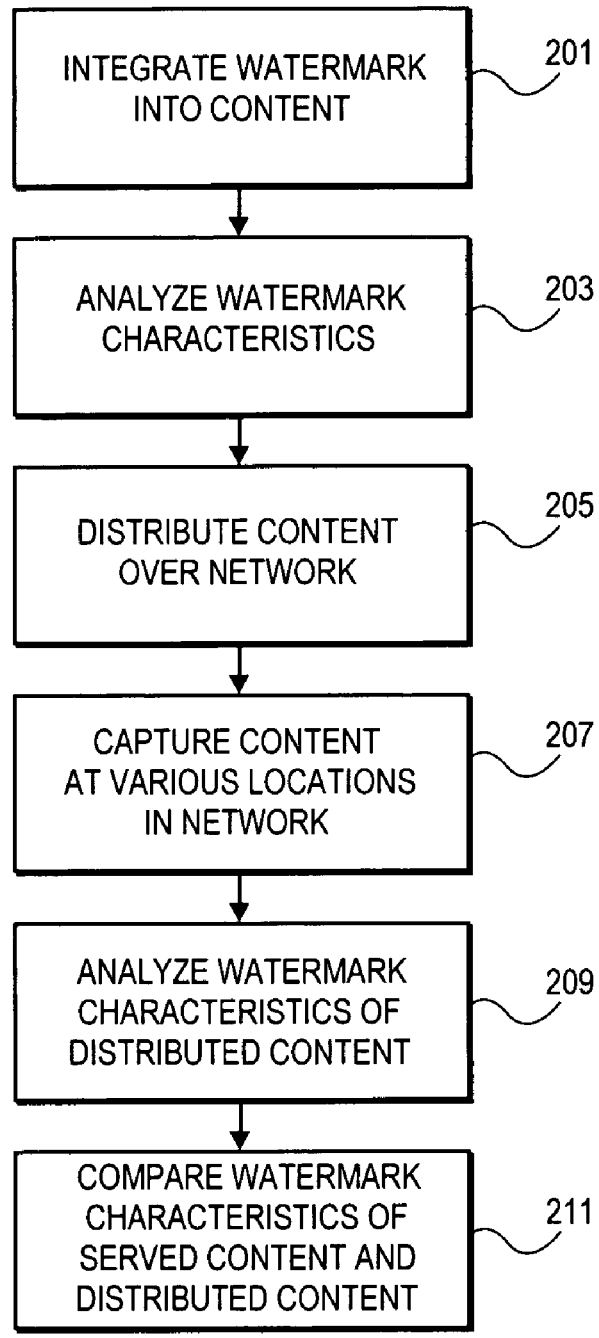
FIG. 2 is a flow diagram illustrating the method of the present invention.

In accordance with one embodiment of the present invention, the content to be served has integrated therewith a digital watermark. Thus, in FIG. 2, at box 201, a digital watermark is integrated into the content. Typically, for live event content, the integration can be done by encoder 40. The process of integration of a digital watermark into content is known in the art and will not be further discussed herein. For pre-recorded events, the integration of the digital watermark into the content is normally done well prior to distribution of the service. In such as case, the content (with the digital watermark) is stored in databases 30–36.

Next, at box 203, the digital watermark content to be served is analyzed to obtain a reference point for a "pure" content signal that has not been served. This allows a measuring stick to be obtained for determining the amount of degradation to the content due to propagation through the network. The analysis is typically performed by hardware or software located at the server 14. In many cases, the server 14 does not directly serve the content to an end user. Instead, the server 14 may distribute the content to an "edge serving site" for redistribution to the eventual end user. Thus, the term server 14 as used herein may encompass a conventional server for serving content to the end user, or may also be what is commonly known as a "broadcast operations center" (BOC) that serves content to a second layer of edge serving sites for eventual distribution to end users.

Next, at box 205, the content is distributed (or served) over the network. At various locations in the network, at box 207, the distributed content is received by at least one monitor station 46. The monitor stations 46 can be specifically designed and placed at strategic nodes in the network. For example, the monitor stations 46 may be placed at edge serving sites or at the end-user locales. In any event, at box 209, the purpose of the monitor stations 46 is to capture the distributed content at various locations in the network and to perform an analysis of the digital watermark to determine the extent of any degradation. Any degradation to the digital watermark would most likely correlate well to the amount of degradation in the actual content. The analysis information done at the monitor stations 46 can then be stored for later retrieval or be automatically sent to the server 14 using any conventional technique.

Next, at box 211, the information on the digital watermark of the distributed content is compared to the information on the digital watermark of the pure content. The comparison can be done using any one of many conventional statistical measures. Based upon this comparison, the quality of delivered content can be assessed. The comparisons can be used to improve delivery systems. For example, if all of the analysis information from monitoring stations using a certain portion of the network indicates severe degradation, a troubleshooting effort may be useful for the hardware for that portion of the network.

As can be appreciated, the selection of a particular digital watermarking technique is important. Generally, the digital watermark selected should be sensitive to degradations of several characteristics. For example, spatial degradation of the image (e.g. speckle, noise, and tearing) should be indicated. Temporal degradation, such as dropped frames and missing packets, should be indicated. System resource usage, such as CPU and memory utilization, should be indicated. Further, the digital watermark should be easily inserted into the content without heavy computation or signal processing. Thus, the digital watermark should be generated on a variety of systems without significant CPU loading. Finally, the digital watermark should be amenable to statistical analysis, so that meaningful statistics can be easily generated.

A digital watermark is often used to establish the ownership and origin of the copyrighted content, even when the content may have been modified (e.g., cropping, re-sizing, orientation). At some point during modification (e.g., posterization), the watermark may be lost. Another goal is that the watermark be used to measure quality. When watermarking is used to measure quality, information about the image quality is needed. One method is to use a watermark image, or a sequence of watermark images (a "watermark video"). By using a known watermark image or watermark video, a known quality-control image can be subliminally added into digital content.

Once content is available in digital format (content might first be captured using a analog system, such a Betamax video tape format) the quality-watermark is added, resulting in quality-watermarked digital content. In one embodiment, the watermark is added when the digital content is available in its highest quality format; for example, a 30 frames/second, 512×488 digital NTSC video, or a 25 frames/second, 356×288 common intermediate format (CIF) video.

The quality-watermark should consist of two at least components: i) a way to determine time intervals, and ii) an image that can be used to gather statistics about image quality. In accordance with the invention, one method is to use a framecounter watermark. The framecounter watermark should be robust to encoding and decoding artifacts, therefore, it should be added in several places in the original image. Specifically, the framecounter watermark may be a checkerboard that covers most of the image.

A second method is to use a known sequence of images, much like the old movie headers that counted down the last seconds before the actual film started. In one embodiment, a simple gray-scale wipe that moves diagonally between the upper-left and lower-right corners may be used. The resulting "quality-watermark video" makes it possible to get a sense of image quality (spatial quality) and timing (temporal quality).

A watermark extraction process can be used to recover the quality-watermark video. In the ideal case, the recovered quality-watermark video can be matched up perfectly to the applied quality-watermark. However, degradations to the composite video (watermarked content) will affect the recovered quality-watermark. By analyzing the recovered quality-watermark spatial and temporal defects, it is possible to determine the quality of the composite video.

Logging and/or monitoring the recovered quality-watermark at a remote site (at sites in the network, or even at end-users) allows the multimedia system to gather data about the quality of the delivered multimedia stream.

However, since current multimedia distribution systems have constrained bandwidth between the digital content and the end-users, the digital content is first encoded into different spatial and temporal resolutions. The encoded format is sent over a network to the end-users, and then decoded. So the encode-decode process will add additional artifacts (quality defects) that cannot be ignored. The multimedia distributor will want to know how to measure these as well.

Since the composite digital content is not available to the users, a new quality baseline needs to be established that comprehends the degradations due to the encode-decode process. The multimedia distributor needs to run the encode-decode process in an ideal environment—one free of the artifacts introduced by the distribution network (packet jitter, lost packets, block errors, etc.). The output of the ideal encode-decode is put through the quality-watermark extraction process; this becomes the quality-baseline used to compare actual multimedia delivery.

As current multimedia distribution systems require several encoding formats to better match the end-user connection characteristics, there needs to be a quality-baseline derived for each encoding format. The types of tests to be performed on the extracted quality-watermark are:

Correlation with the expected quality-watermark image (quality baseline(s)), both spatially and temporally, RMS deviations in spatial amplitudes from quality baseline(s), Frequency deviations from quality baseline(s), Size, in pixels, of deviations from quality baseline(s), and Duration, in milliseconds, of pixel deviations from quality baseline(s).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
   a content server connected to a network, said content server capable of delivering content over said network, said content containing a digital watermark; and
   at least one monitor station to receive said content over said network and analyze said digital watermark for degradation, wherein degradation of said digital watermark is indicative of degradation of said content.

2. The system of claim 1 wherein said network is the Internet.

3. The system of claim 1 wherein said content is multimedia content.

4. The system of claim 1 further including a content server monitor station to receive said content directly from said content server and analyzing said digital watermark.

5. The system of claim 1 wherein said digital watermark is a checkerboard pattern or a gray-scale image.

6. The apparatus of claim 1 wherein said content server is a broadcast operations center to serve content to a plurality of edge serving sites.

7. The apparatus of claim 6 wherein a monitor station is located at one of said plurality of edge serving sites.

8. A method, comprising:
integrating a digital watermark into content;
distributing said content over a network as distributed content;
receiving said distributed content in at least one location of said network;
analyzing said digital watermark of said distributed content for degradation, wherein degradation of said digital watermark is indicative of the quality of said distributed content.

9. The method of claim 8, further including analyzing said content prior to distribution over said network for information indicative of the quality of said content.

10. The method of claim 9, further including comparing the information indicative of the quality of said distributed content to the information indicative of the quality of said content.

11. A machine-readable medium having stored thereon instructions, which if executed by a processor, cause the processor to effect the following, comprising:
integrating a digital watermark into content;
distributing said content over a network as distributed content;
receiving said distributed content in at least one location of said network;
analyzing said digital watermark of said distributed content for degradation, wherein degradation of said digital watermark is indicative of the quality of said distributed content.

12. The machine-readable medium of claim 11, further including instructions for analyzing said content prior to distribution over said network for information indicative of the quality of said content.

13. The machine-readable medium of claim 11, further including instructions for comparing the information indicative of the quality of said distributed content to the information indicative of the quality of said content.

14. A system comprising:
means to serve content that is connected to a network, said means to serve content capable of delivering content over said network, said content containing a digital watermark; and
means for monitoring to receive said content over said network and analyzing said digital watermark for degradation, wherein degradation of said digital watermark is indicative of degradation of said content.

15. The system of claim 14 wherein said network is the Internet.

16. The system of claim 14 wherein said content is multimedia content.

17. The system of claim 14 further including a content server monitor station to receive said content directly from said means for serving content and analyzing said digital watermark.

18. The system of claim 14 wherein said digital watermark is a checkerboard pattern or a gray-scale image.

19. The apparatus of claim 14 wherein said means to serve content is a broadcast operations center for serving content to a plurality of edge serving sites.

* * * * *